(12) United States Patent
Carter

(10) Patent No.: US 10,843,619 B1
(45) Date of Patent: Nov. 24, 2020

(54) DEVICE AND METHOD FOR SECURING AND ORGANIZING A CARGO STRAP

(71) Applicant: Will Carter, McLeansville, NC (US)

(72) Inventor: Will Carter, McLeansville, NC (US)

( * ) Notice: Subject to any disclaimer, the term of this patent is extended or adjusted under 35 U.S.C. 154(b) by 27 days.

(21) Appl. No.: 16/258,963

(22) Filed: Jan. 28, 2019

Related U.S. Application Data

(60) Provisional application No. 62/625,550, filed on Feb. 2, 2018.

(51) Int. Cl.
*B60P 7/08* (2006.01)

(52) U.S. Cl.
CPC ........... *B60P 7/0846* (2013.01); *B60P 7/0853* (2013.01)

(58) Field of Classification Search
CPC .................................................... B60P 7/0846
See application file for complete search history.

(56) References Cited

U.S. PATENT DOCUMENTS

| | | | | |
|---|---|---|---|---|
| 2,204,939 A | * | 6/1940 | Lyons ................... | H01R 13/72 191/12 R |
| 2,772,056 A | * | 11/1956 | Geisinger .......... | B65H 75/4473 242/405.1 |
| D180,332 S | * | 5/1957 | Lee ................................ | D8/358 |
| 3,626,495 A | * | 12/1971 | Bastian, Jr. ............ | B65H 75/06 242/405.2 |
| 3,832,746 A | * | 9/1974 | Korsgaard .............. | B63C 11/26 441/6 |
| 4,123,012 A | * | 10/1978 | Hough ................... | B65H 75/06 242/405.2 |
| 4,261,529 A | * | 4/1981 | Sandberg ............... | B65H 75/06 242/405.2 |
| D437,773 S | * | 2/2001 | Kinn ............................. | D8/358 |
| 6,802,471 B1 | * | 10/2004 | Gambrell ............... | B65H 75/06 191/12 R |
| D599,197 S | * | 9/2009 | Hawley .......................... | D8/358 |
| 7,766,271 B1 | | 8/2010 | Confoey ....................... | 242/395 |
| 7,861,382 B1 | | 1/2011 | Madachy et al. .................. | 24/68 |
| 8,037,580 B2 | | 10/2011 | Huang ............................... | 24/68 |
| 8,079,116 B2 | | 12/2011 | Ayers et al. ...................... | 24/68 |

* cited by examiner

*Primary Examiner* — Hilary L Gutman
(74) *Attorney, Agent, or Firm* — NK Patent Law

(57) ABSTRACT

A device and method for organizing a cargo strap. The device comprises a plate that is substantially flat and rigid, and a retention strap pivotally attached to the plate and adapted for removably securing the cargo strap about the plate. The plate has a length and a width wherein the length is greater than the width thereby defining a substantially rectangular upper receiving face and an opposing lower receiving face. A portion of the cargo strap is wound around the plate and secured onto the plate by wrapping the retention strap over the cargo strap. A slot may be included on the plate to receive a portion of the cargo strap to secure a distal end of the cargo strap onto the plate.

6 Claims, 4 Drawing Sheets

DEVICE AND METHOD FOR SECURING AND ORGANIZING A CARGO STRAP

This application claims the benefit of provisional application No. 62/625,550, filed Feb. 2, 2018, which is incorporated herein by reference in its entirety.

FIELD

The present disclosure relates generally to cargo, more particularly, to an improved device and method for securing and organizing the free length of a cargo strap.

BACKGROUND

Previous solutions of securing and organizing the free, unused portion of a cargo strap during storage and in use are too cumbersome, fragile, intricate and often inhibit the use of the cargo strap variation as it was originally designed to function. Furthermore, previous solutions have an added burden for the user to retain the device elsewhere when not in use. Unlike the traditional solutions, these inventions herein easily allow the user to control the length of their cargo strap in seconds while never inhibiting the original operating mechanics of the cargo strap device. Further, unlike the traditional solutions, these inventions herein provide a means of securely attaching the device to the strap so there are no free parts to misplace. Still further, unlike the traditional solutions, these inventions herein are manufactured in a way that produce a device that is equal in durability to the cargo strap variation it is designed to support.

Therefore, Applicant desires cargo strap assemblies, plates, devices, and methods for establishing cargo-related organization without the drawbacks presented by the traditional systems and methods.

SUMMARY

In accordance with the present disclosure, a device and method is provided for aligning a cargo strap, and more particularly, for organizing and adjusting the slack of a cargo strap.

In one embodiment, a cargo strap plate includes a substantially flat and rigid body having length and a width, wherein the length is greater than the width forming a substantially rectangular shape wherein the width is tapered toward a center of the plate; a slot adapted to receive and secure a portion of the cargo strap; a first pair of opposed projections on a proximate end of the plate and a second pair of opposed projections on a distal end of the plate; and a retention strap attached substantially at a center of the plate and adapted for securing the cargo strap to the plate. Typically, a portion of the cargo strap wound around the plate and secured onto the plate by wrapping the retention strap over the cargo strap in a semi-fixed position.

In some examples, the retention strap is generally attached perpendicularly to the length of the plate. The retention strap may be pivotally attached to the plate. The retention strap may have a hook and loop fastener. The retention strap may secure the cargo strap to the plate.

In another embodiment, a device includes a plate that is generally substantially flat and rigid, the plate having a length and a width wherein the length is greater than the width thereby defining a substantially rectangular upper receiving face and an opposing lower receiving face, and a retention strap pivotally attached to the plate and adapted for removably securing the cargo strap about the plate. A portion of the cargo strap is wound around the plate and secured onto the plate by wrapping the retention strap over the cargo strap.

In one embodiment, the plate may further include a slot adapted to receive a portion of the cargo strap to secure a distal end of the cargo strap onto the plate. In another embodiment, a pair of opposed projections may be included on an end of the plate for receiving a portion of the cargo strap and adapted to prevent the cargo strap from slipping off the plate. A second pair of opposed projections may also be included on an opposing end of the plate for receiving a downstream portion of the cargo strap to further prevent the cargo strap from slipping off the plate. In certain examples, the width of the plate may be tapered toward a center of the plate.

The retention strap may be attached substantially in the center of the plate. For example, the retention strap may be attached perpendicularly to the length of the plate. In some embodiments, the retention strap comprises a hook and loop fastener.

Accordingly, another embodiment provides a device for organizing a cargo strap comprising a plate that is substantially flat and rigid, the plate having a length and a width wherein the length is greater than the width forming a substantially rectangular shape wherein the width is tapered toward a center of the plate, a slot on the plate adapted to receive a portion of the cargo strap to secure the cargo strap onto the plate, a first pair of opposed projections on an end of the plate and a second pair of opposed projections on an opposing end of the plate, and a retention strap attached substantially at a center of the plate and adapted for securing the cargo strap to the plate. A portion of the cargo strap is wound around the plate and secured onto the plate by wrapping the retention strap over the cargo strap. In one example, the plate may be comprised of steel.

Another aspect of the present inventions is to provide a method for organizing a cargo strap. In one embodiment, the method may comprise the steps of winding a portion of a cargo strap around a plate that is substantially flat and rigid and having a substantially rectangular shape, and wrapping a retention strap over the cargo strap to secure the cargo strap to the plate. The method may further include the step of inserting a portion of the cargo strap into a slot on the plate to secure an end of the cargo strap onto the plate. The step of winding a portion of a cargo strap may comprise wrapping the portion of the cargo strap around a length of the plate. For example, the step of winding a portion of a cargo strap may comprise wrapping the portion of the cargo strap within a pair of opposed projections on each end along the length of the plate.

The above summary was intended to illustrate certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF THE PREFERRED EMBODIMENTS

Figure 1:
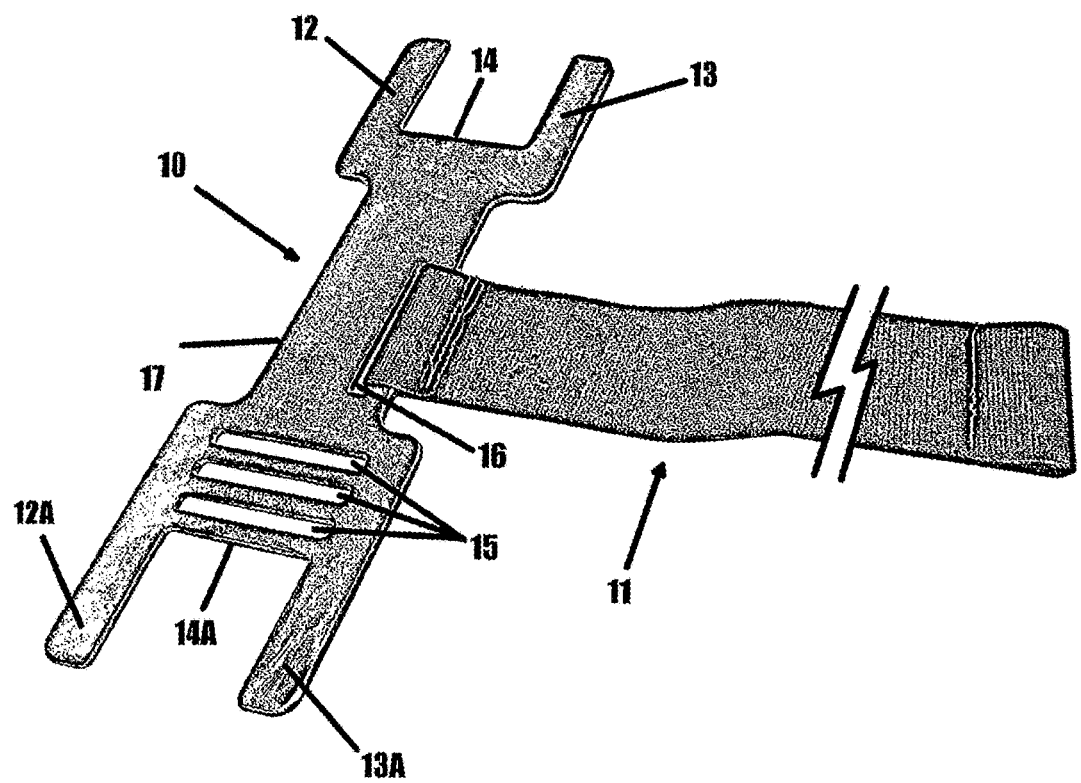
FIG. 1 is an overhead perspective view of a device for aligning a cargo strap constructed according to one embodiment of the present inventions.
Figure 2:
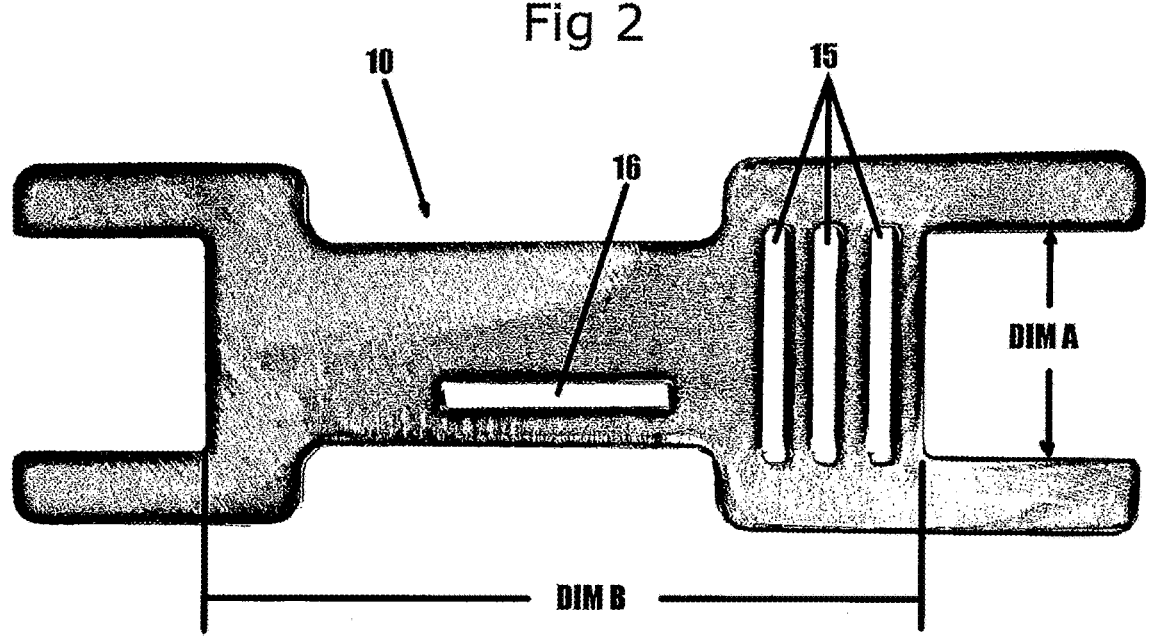
FIG. 2 is a top plan view of the plate shown in FIG. 1.
Figure 3:
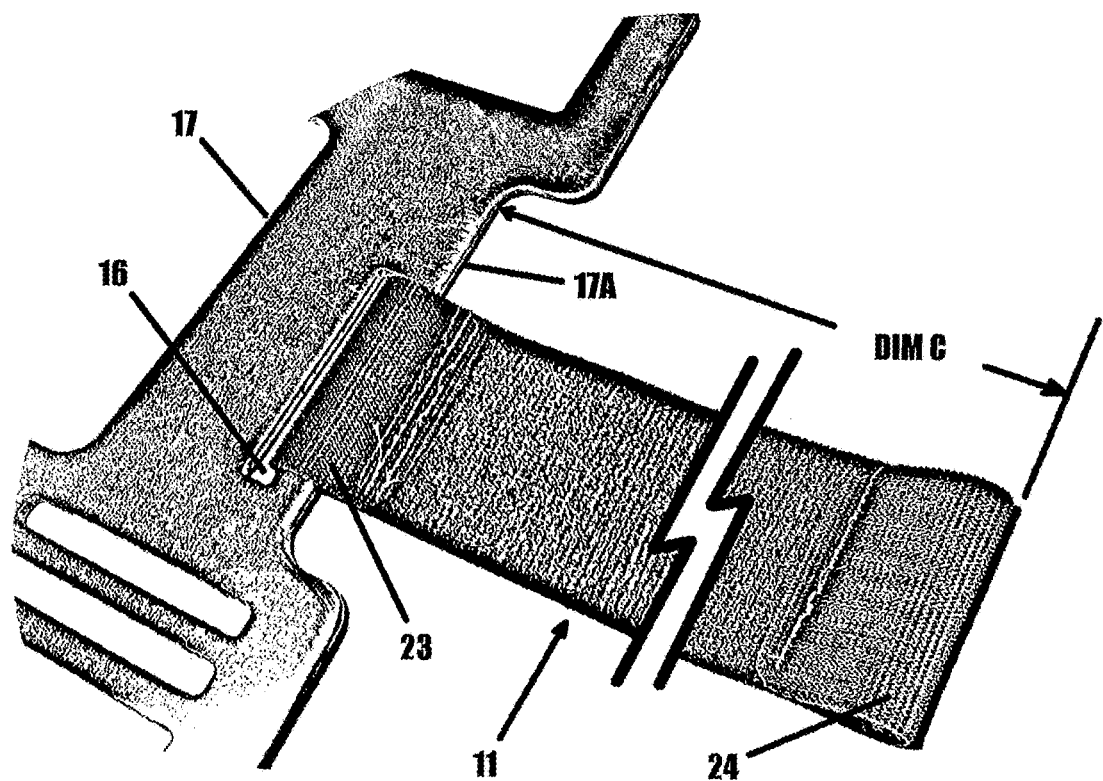
FIG. 3 is an enlarged perspective view of the embodiment shown in FIG. 1.
Figure 4:
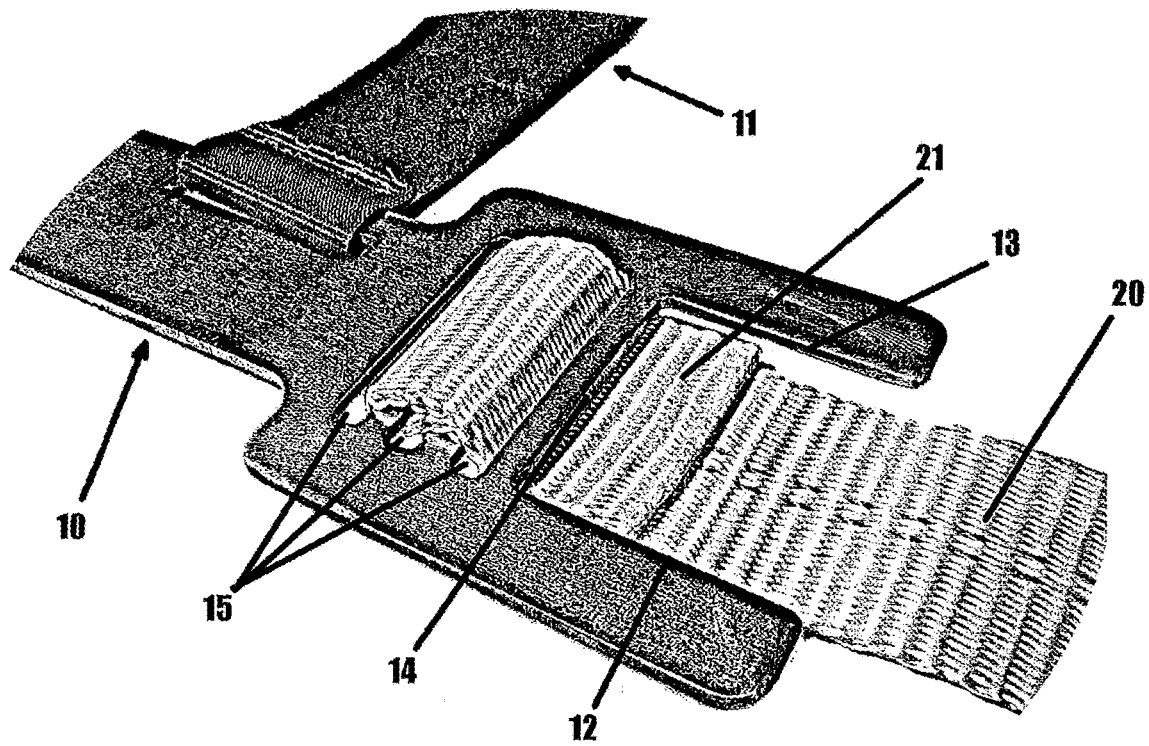
FIG. 4 is an enlarged perspective view of one embodiment wherein a distal end of a cargo strap is secured onto a plurality of slots on the plate.
Figure 5:
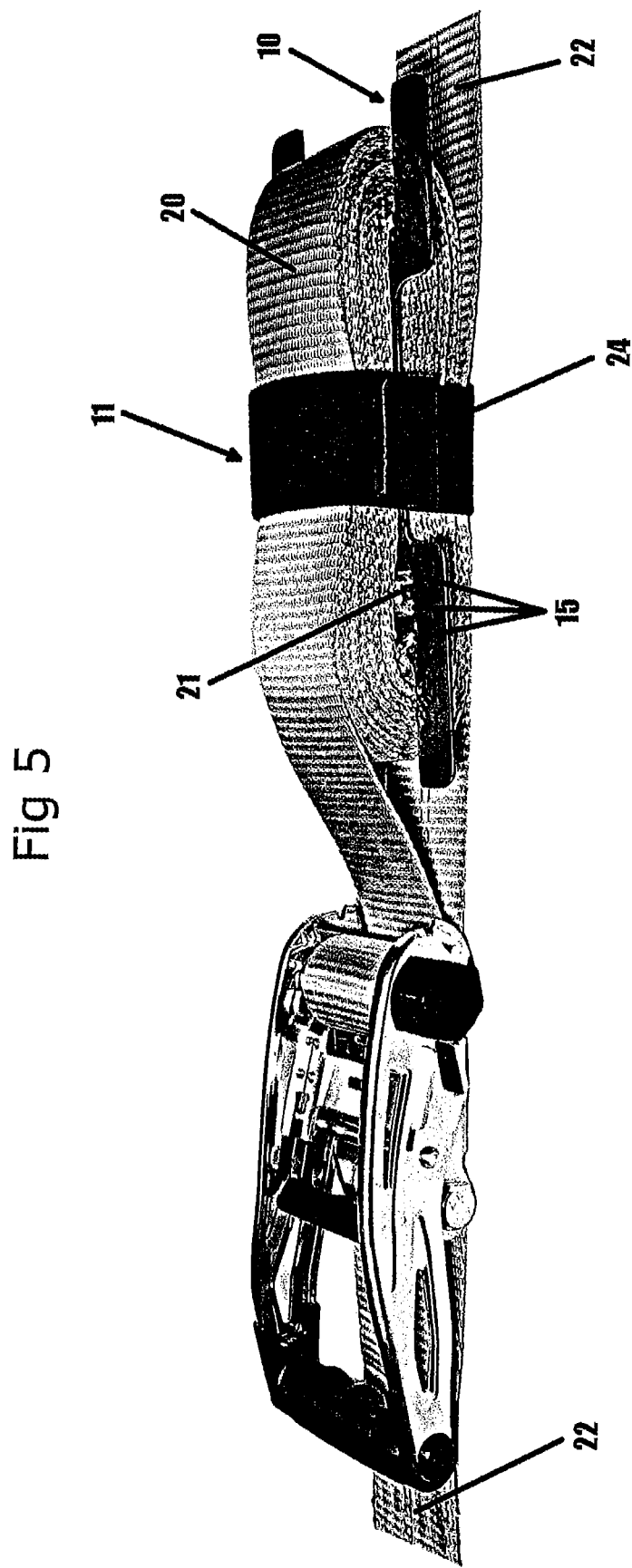
FIG. 5 is a side perspective view of the device shown in FIG. 1 with a cargo strap aligned onto the plate and secured by the retention strap.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing an embodiment of the invention and are not intended to limit the inventions thereto. As seen in FIGS. 1-7, a device for controlling and organizing the excess length of a cargo strap is shown constructed according to the present inventions.

Figure 6:
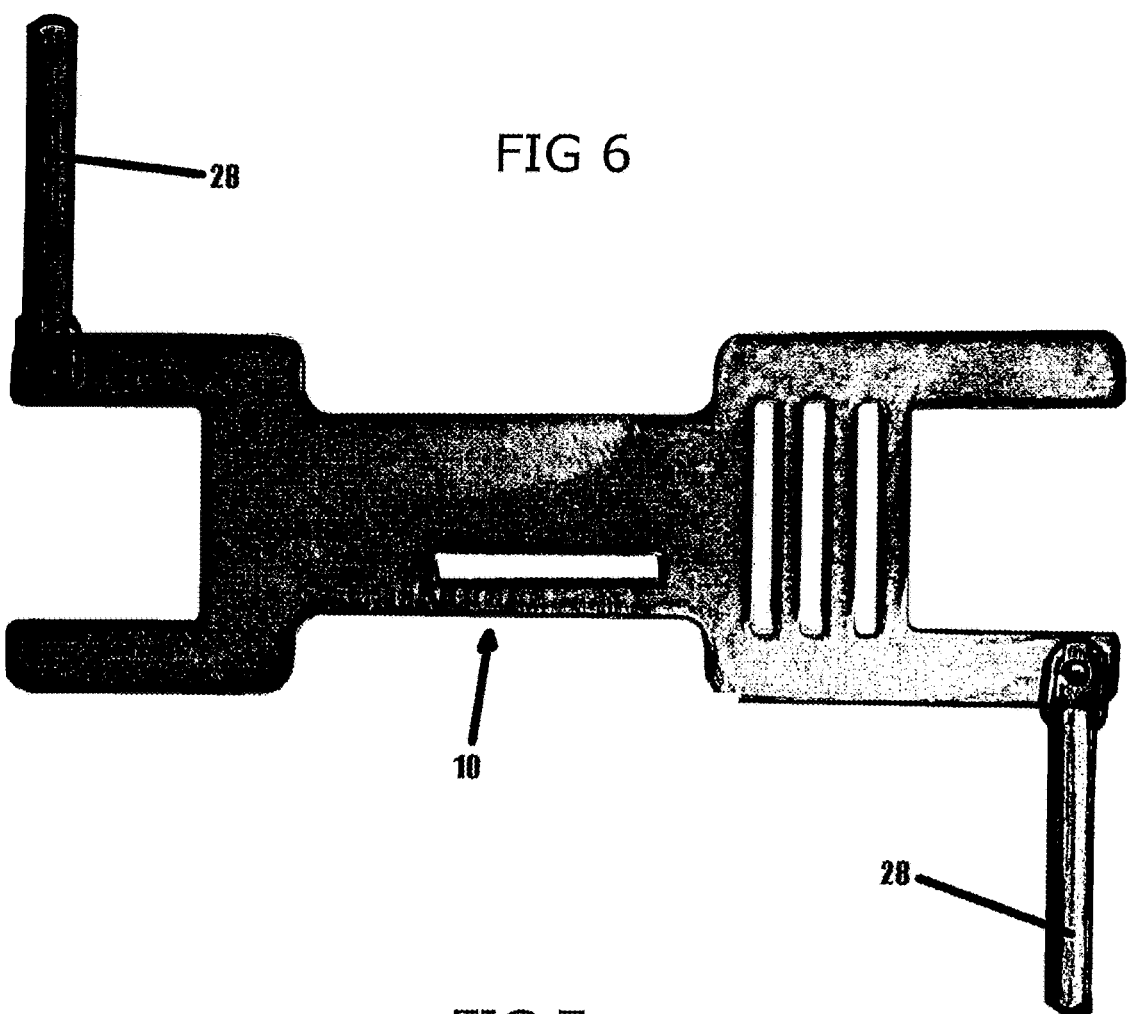
FIG. 6 is a top plan view of a device for aligning a cargo strap constructed according to another embodiment of the present inventions.
Figure 7:
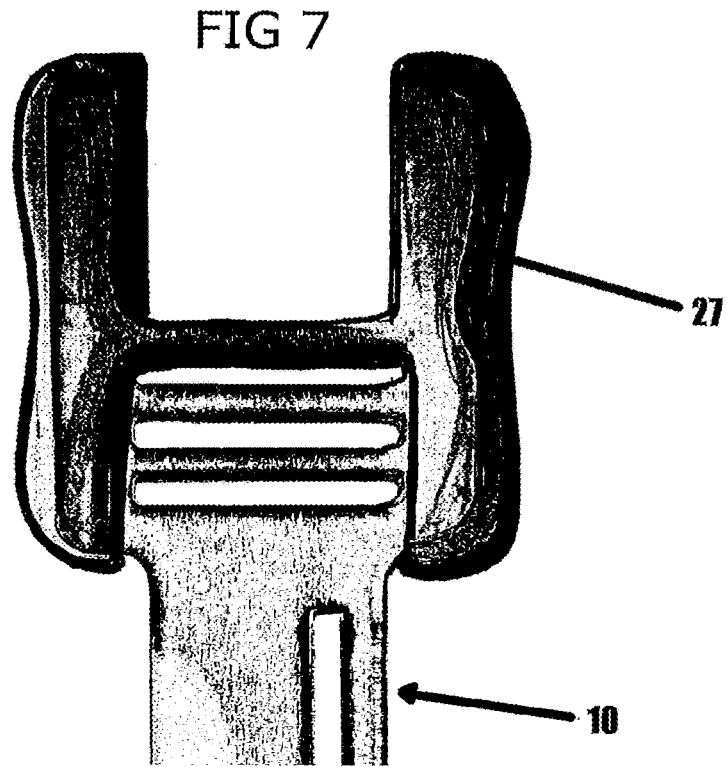
FIG. 7 is an enlarged front view of another embodiment of a device for aligning a cargo strap constructed according to the present inventions.

In the embodiment shown, the device consists of a singular plane flat plate structure 10 with an attached hook and loop retention device 11. Plate 10 consists of two parallel edges 14,14A spaced at distance of DIM B determined by the type of cargo strap the device is designed for and varies. Perpendicular to the edges 14,14A are pairs of projections 12, 13,12A,13A. The spacing DIM A between the two pairs of projections is determined by the type of cargo strap the device is designed for and varies. As seen in FIG. 7, one embodiment of the device may incorporate plastic or similar material moldings 27 that cover the projections to prevent chafing of the strap and to aid in branding. Slightly inset from surface 14 is a series of slots 15 equal in length to DIM A and a width to accommodate the thickness of the cargo strap being designed for and varies. At the midpoint of the plate is a slot 16 offset and parallel to the side of the plate and is used to attach the retention device 11. The outside edges of the plate 17,17A taper in to a dimension that is equal to DIM A. The retention device 11 consists of a double sided hook and loop webbing that is inserted through slot 16 and secured back upon itself at a sewn or fused connection 23. At the opposite end of the retention device 11 the hook and loop webbing is folded back upon itself and sewn or fused to produce a loop 24. The length of the retention device DIM C is determined by the type of cargo strap the device is designed for and varies. FIG. 6 illustrates an alternative embodiment wherein the device incorporates pivoting hand holds 28 attached near the projections 12,13, 12A,13A.

In use, the free excess end of the cargo strap 20 may be woven through slots 15 in a manner that securely retains the strap end 21 to plate 10. During cargo strap storage, the entire length of cargo strap 20 is wound onto plate 10 around edges 14,14A and is aligned by projections 12,13,12A,13A and is wrapped and restrained by the retention device 11.

During cargo strap use, the amount of cargo strap unwound can be estimated by the user due to the spacing of edges 14,14A specified by DIM B. By unwinding the cargo strap 20 from the device 10 the user is able to accurately estimate the length of strap exposed for use. The excess unused strap 20 is wound onto plate 10 around edges 14,14A and is aligned by projections 12,13,12A,13A. In the embodiment of the device with pivoting hand holds 28 the user may grasp the device by the holds and use a hand-over-hand motion to roll the excess strap quickly. The pivoting hand holds 28 are pivoted opened perpendicular to the length of the device for use or pivoted closed parallel to the length of the device for storage. The retention device 11 is then wrapped around both the excess wound strap 20 and the taut portion of the in-use section of strap 22 to provide a secure mounting position for the entire assembly. The retention device 11 can also be fastened around any other secure structure.

Sample Dimensions:

For a 1" wide, 12' long cargo strap—DIM A: 1.20", DIM B: 5.80", DIM C: 8.00"

For a 2" wide, 25' long cargo strap—DIM A: 2.20", DIM B: 11.80", DIM C: 14.00"

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A cargo strap organizing device, the device comprising:
   a plate comprising a longitudinal first end and an opposite longitudinal second end, the plate defining:
      a first cargo strap receiving cutout on the first end of the plate, the first cutout having an inward edge;
      a second cargo strap receiving cutout on the second end of the plate, the second cutout having an inward edge longitudinally spaced from the inward edge of the first cutout;
      a longitudinally extending first slot formed in the plate spaced from the inward edge of the first cutout and spaced from the inward edge of the second cutout;
      a second slot formed in the plate and positioned between the first slot and the inward edge of the second cutout, the second slot perpendicular to the first slot;
   a retention strap attached to the plate by an attached end thereof looped through the first slot, the retention strap extending, in an unwrapped condition thereof, laterally from the attached end and plate;
   wherein, in operation, a terminal end of a cargo strap is received within the second slot to secure the terminal end to the plate, and a wound portion of the cargo strap is wound around the plate in a circular direction such that spaced-apart portions of wound portion the cargo strap are received within the first cutout and the second cutout, and the retention strap, in a wrapped condition thereof, is wrapped around a medial portion of the wound portion of the cargo strap.

2. The cargo strap organizing device of claim 1, wherein the plate further defines a third slot and a fourth slot each longitudinally spaced from and parallel to the second slot.

3. The cargo strap organizing device of claim 1, the plate further comprising:
   a longitudinally extending first pair of projections between which the first cutout is defined; and
   a longitudinally extending second pair of projections between which the second cutout is defined.

4. The cargo strap organizing device of claim 3, further comprising a first hand hold and a second hand hold by which to rotate the plate to wind and unwind the wound portion of the cargo strap, wherein:
   the first hand hold is pivotally attached to one of the first pair of projections, the first hand hold, in a pivoted open position thereof, extending in a first lateral direction from the plate; and
   the second hand hold is pivotally attached to one of the second pair of projections, the second hand hold, in a pivoted open position thereof, extending in a second lateral direction from the plate opposite the first lateral direction.

5. The cargo strap organizing device of claim 4, wherein each of the first hand hold and second hand hold has a pivoted closed position perpendicular to the pivoted open position thereof.

6. The cargo strap organizing device of claim 1, wherein the retention strap comprises double-sided hook and loop webbing.

\* \* \* \* \*